(12) United States Patent
Lotfizadeh (10) Patent No.: US 9,921,800 B2
(45) Date of Patent: Mar. 20, 2018

(54) METHODS, SYSTEMS AND MEDIA FOR CONTROLLING AUDIO OUTPUT

(71) Applicant: Google Inc., Mountain View, CA (US)

(72) Inventor: Nima Lotfizadeh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/164,406

(22) Filed: May 25, 2016

(65) Prior Publication Data

US 2017/0344336 A1 Nov. 30, 2017

(51) Int. Cl.
*H04B 3/00* (2006.01)
*G06F 3/16* (2006.01)
*H04R 3/12* (2006.01)
*H04R 29/00* (2006.01)

(52) U.S. Cl.
CPC .............. *G06F 3/165* (2013.01); *H04R 3/12* (2013.01); *H04R 29/001* (2013.01); *H04R 2420/05* (2013.01)

(58) Field of Classification Search
CPC ......... G06F 3/165; H04R 3/12; H04R 29/001; H04R 2420/05
USPC .......................................................... 381/80
See application file for complete search history.

(56) References Cited

U.S. PATENT DOCUMENTS

| 6,321,278 B1 * | 11/2001 | Phu ........................ G06F 3/165 381/81 |
| 2002/0126703 A1 * | 9/2002 | Kovacevic ......... H04N 21/4307 370/487 |
| 2009/0179768 A1 * | 7/2009 | Sander .................... H04M 1/05 340/13.27 |
| 2014/0055167 A1 * | 2/2014 | Oh ........................ G01R 31/024 327/63 |
| 2014/0111419 A1 * | 4/2014 | Takayama ................. G06F 3/01 345/156 |
| 2014/0211960 A1 * | 7/2014 | Dowdy ................ G11B 27/031 381/77 |

(Continued)

FOREIGN PATENT DOCUMENTS

| GB | 2496249 | 5/2013 |
| GB | 2496249 A * | 5/2013 |

OTHER PUBLICATIONS

International Search Report and Written Opinion dated Mar. 20, 2017 in International Patent Application No. PCT/US2016/065,556.

*Primary Examiner* — Vivian Chen
*Assistant Examiner* — Friedrich W Fahnert
(74) *Attorney, Agent, or Firm* — Byrne Poh LLP (57) ABSTRACT

Methods, systems, and media for controlling audio output are provided. In some implementations, a method for controlling audio output is provided, the method comprising: receiving, by a computing device, audio content to be presented; determining that an output port of the computing device is connected to a corresponding connector; providing the audio content at the output port; recording a first portion of audio using a microphone; determining that the audio content is present in the first portion of audio; continuing to provide the audio content at the output port; recording a second portion of audio using the microphone; determining that the audio content is not present in the second portion of audio; and presenting the audio content using a speaker of the computing device.

18 Claims, 4 Drawing Sheets

(56) References Cited

U.S. PATENT DOCUMENTS

2014/0282660 A1 9/2014 Oztaskent et al.
2015/0186509 A1* 7/2015 Kelly .................. G06F 1/3206
　　　　　　　　　　　　　　　　707/748

* cited by examiner

METHODS, SYSTEMS AND MEDIA FOR CONTROLLING AUDIO OUTPUT

TECHNICAL FIELD

Methods, systems and media for controlling audio output are provided.

BACKGROUND

Devices that interact with users primarily through audio commands given by the user, and audio feedback provided to the user through a built-in speaker have recently become more popular. With such devices, users can ask questions, dictate messages, listen to written messages that are read out loud by the device, play music, and perform other tasks through audio interaction without having to interact with a graphical user interface. Some users may wish to connect such devices to external speakers, but this may limit the usefulness of the device if the external speakers are off, or otherwise not playing the audio output by the device.

Accordingly, new methods, systems and media for controlling audio output are provided.

SUMMARY

In accordance with some implementations of the disclosed subject matter, mechanisms for controlling audio output are provided.

In accordance with some implementations of the disclosed subject matter, a method for controlling audio output is provided, the method comprising: receiving, by a computing device, audio content to be presented; determining that an output port of the computing device is connected to a corresponding connector; in response to determining that the output port is connected to the corresponding connector, providing the audio content at the output port; recording a first portion of audio using a microphone of the computing device; determining that the audio content is present in the first portion of audio; subsequent to determining that the audio content is present in the first portion of audio, continuing to provide the audio content at the output port; recording a second portion of audio using the microphone; determining that the audio content is not present in the second portion of audio; and in response to determining that the audio content is not present in the second portion of audio, presenting the audio content using a speaker of the computing device.

In accordance with some implementations of the disclosed subject matter, a system for controlling audio output is provided, the system comprising: a computing device comprising: an output port; a microphone; a speaker; and a hardware processor that is programmed to: receive audio content to be presented; determine that the output port of the computing device is connected to a corresponding connector; in response to determining that the output port is connected to the corresponding connector, provide the audio content at the output port; record a first portion of audio using the microphone; determine that the audio content is present in the first portion of audio; subsequent to determining that the audio content is present in the first portion of audio, continue to provide the audio content at the output port; record a second portion of audio using the microphone; determine that the audio content is not present in the second portion of audio; and in response to determining that the audio content is not present in the second portion of audio, present the audio content using the speaker.

In accordance with some implementations of the disclosed subject matter, a non-transitory computer-readable medium containing computer executable instructions that, when executed by a processor, cause the processor to perform a method for controlling audio output is provided, the method comprising: receiving, by a computing device, audio content to be presented; determining that an output port of the computing device is connected to a corresponding connector; in response to determining that the output port is connected to the corresponding connector, providing the audio content at the output port; recording a first portion of audio using a microphone of the computing device; determining that the audio content is present in the first portion of audio; subsequent to determining that the audio content is present in the first portion of audio, continuing to provide the audio content at the output port; recording a second portion of audio using the microphone; determining that the audio content is not present in the second portion of audio; and in response to determining that the audio content is not present in the second portion of audio, presenting the audio content using a speaker of the computing device.

In accordance with some implementations of the disclosed subject matter, a system for controlling audio output is provided, the system comprising: means for outputting an audio signal; means for recording audio; means for presenting audio content; means for receiving audio content to be presented; means for determining that the means for outputting the audio signal is connected to a corresponding connector; means, responsive to the means for determining that the output port is connected to the corresponding connector, for providing the audio content at the means for outputting the audio signal; means for recording a first portion of audio using means for recording audio; means for determining that the audio content is present in the first portion of audio; means for continuing to provide the audio content at the means for outputting the audio signal; means for recording a second portion of audio using the means for recording audio; means for determining that the audio content is not present in the second portion of audio; and means, responsive to the means for determining that the audio content is not present in the second portion of audio, for presenting the audio content using a speaker of the computing device.

In some implementations, the system further comprises: means for determining that the means for outputting the audio signal is no longer connected to the corresponding connector; and means, responsive to the means for determining that the means for outputting audio is no longer connected to the corresponding connector, for inhibiting the audio content from being provided to the means for outputting the audio signal.

In some implementations, the means for determining that the audio content is present in the first portion of audio comprises: means for generating an audio fingerprint based on the first portion of audio; means for determining that the audio fingerprint based on the first portion of audio matches an audio fingerprint generated based on the audio content; and means, responsive to the means for determining that the audio fingerprint based on the first portion of audio matches an audio fingerprint generated based on the audio content, for determining that the audio content is present in the first portion of audio.

In some implementations the means for determining that the audio content is present in the first portion of audio comprises: means for calculating a difference between a portion of the audio content provided at the output port and the first portion of audio; and means for determining that the audio content is present in the first portion of audio based on the difference.

In some implementations, the means for outputting the audio signal is a 3.5 millimeter jack.

In some implementations, the system further comprises means, responsive to the means for determining that the audio content is present in the first portion of audio, for inhibiting the audio content from being presented using the speaker of the computing device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some implementations of the disclosed subject matter, mechanisms (which can include methods, systems and media) for controlling audio output are provided.

In some implementations, the mechanisms described herein can control the output of audio from a computing device that can interact with a user through an audio user interface to one or more external speakers. In some implementations, a user can request that the computing device present audio content using any suitable technique or combination of techniques. For example, the user can make the request through a voice command by speaking one or more words, through an application on another device such as a smartphone or tablet computer, through a graphical user interface of the computing device, and/or through any other suitable user interface. In some implementations the audio content can be any suitable audio content and/or can be provided from any suitable source. For example, the audio content can be content that is stored as one or more audio signals such as music or an audio book. As another example, the audio content can be content that is converted to audio from text such as an article, a message (e.g., an email, a text message, etc.), a recipe, a web page, etc. In such examples, the audio content can be available from any suitable source such as internal memory of the computing device, internal memory of another device local device (e.g., a smartphone, a tablet computer, a personal computer, network attached storage, etc.) from which the computing device can access the content, remote storage (e.g., a server) that is associated with a user of the computing device, a service that provides access to audio content (e.g., a streaming audio service, a streaming video service, etc.), a web server that provides access to web pages, and/or any other suitable source. In a more particular example, a user can speak one or more words requesting that the computing device play music from a particular artist from a particular streaming music service which the user may access through a user account.

In some implementations, the computing device can receive the audio content to be presented and determine whether to present the audio content through an internal speaker or to output the audio content for presentation by an external speaker. For example, a user can connect an audio output of the computing device to an external sound system that includes external speakers that may provide a subjectively more enjoyable audio experience for the user. In a more particular example, the user can connect a cable having a 3.5 millimeter (mm) plug at one end to a 3.5 millimeter output jack of the computing device, and can connect the other end of the cable to a jack of an audio video receiver that is connected to one or more external speakers.

In some implementations, the computing device can detect that the audio output is connected to a corresponding connector and attempt to determine whether audio that is provided to the connector is presented by external speakers. For example, the computing device can detect that the 3.5 mm jack is connected to something that has one or more properties that a 3.5 mm plug has. In some implementations, when the connector is detected, the computing device can provide the audio content to the audio output, and record a signal produced by a microphone of the computing device. In some implementations, the computing device can compare the recorded signal to the output signal to determine whether the signal that is being output is being played by any nearby (e.g., close enough to be recorded at sufficient volume) external speakers. For example, the computing device can record its surroundings with a microphone and compare the recorded signal to the music being output to the audio output to determine whether that same music has been recorded by the microphone.

In some implementations, if the audio that is recorded does not match the audio that is being provided to the audio output, the computing device can present the audio content using the internal speaker. For example, if the audio video receiver is powered down, the computing device can determine that the music being provided to the 3.5 mm jack is not present in the recorded audio signal, and can begin playing the music over the internal speaker.

Figure 1:
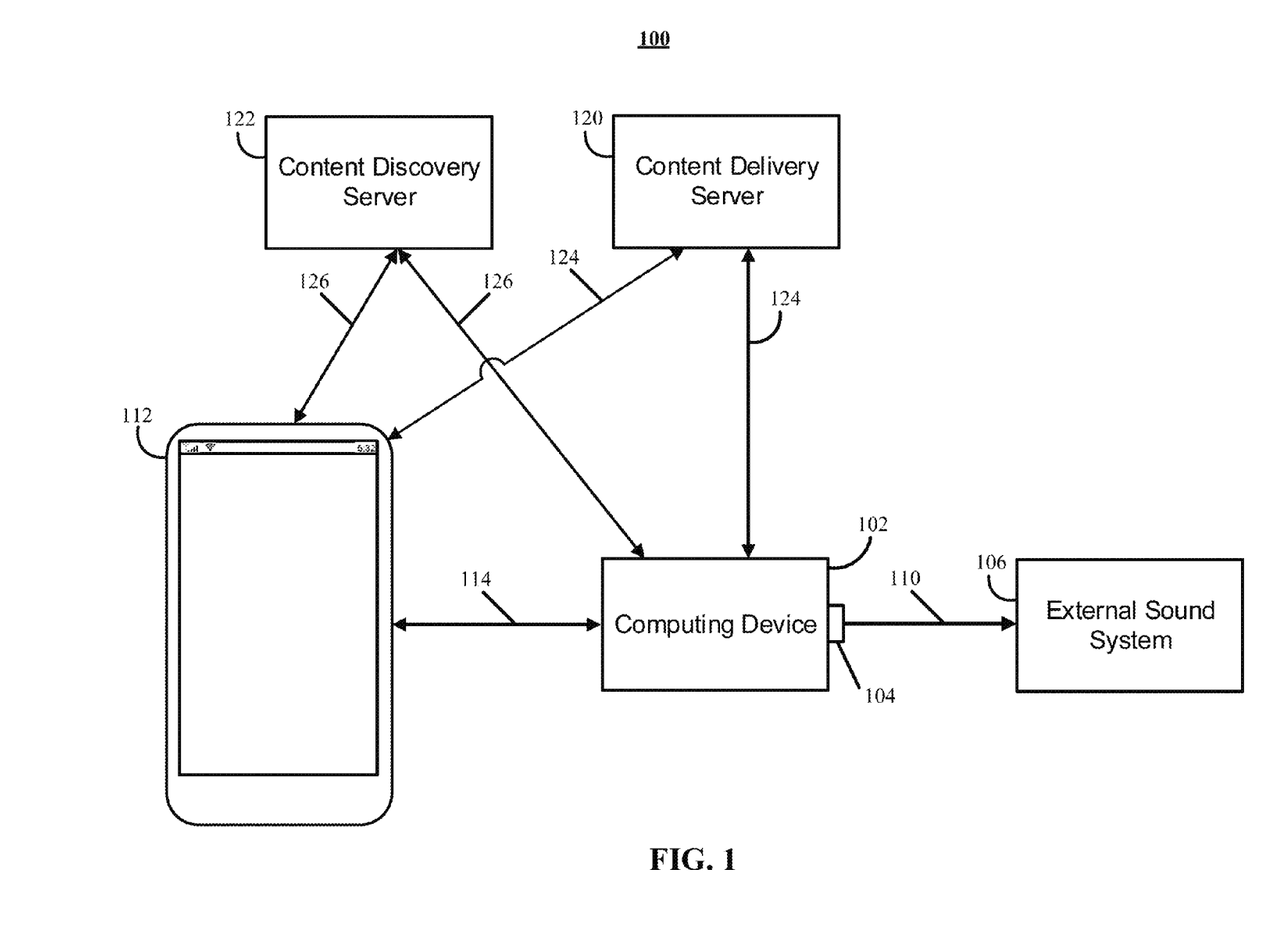
FIG. 1 shows an example of a system for controlling audio output in accordance with some implementations of the disclosed subject matter.

Turning to FIG. 1, an example 100 of a system for controlling audio output is shown in accordance with some implementations of the disclosed subject matter. In some implementations, system 100 can include a computing device 102, which can include an output connector 104. Output port 104 can be any suitable output connector for communicating audio information with an external sound system 106. For example, output port 104 can be a 3.5 mm jack that accepts a 3.5 mm connector, a fiber optic audio port (e.g., that accepts a TOSLINK connector), an RCA jack, a High-Definition Multimedia Interface (HDMI) port, a Universal Serial Bus (USB) port (e.g., a USB 2.x port, a USB 3.x port, etc.), a THUNDERBOLT port, an Ethernet port (whether wired or wireless), any other suitable port and/or any suitable combination of ports.

In some implementations, external sound system 106 can be any suitable device that can receive an audio signal and output the audio signal (potentially through one or more intermediate devices) to one or more speakers. For example, external sound system 106 can be an audio video (AV) receiver, a speaker, an amplifier, an audio switch, an HDMI switch, any other suitable external sound system and/or any suitable combination thereof. More particularly, external sound system 106 can include, speakers, hardware and/or software for rendering media content such as analog and/or digital audio and/or video data, a power supply, etc. External sound system 106 can include various input ports for receiving audio and/or video data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc. Additionally or alternatively, in some implementations, external sound system 106 can be configured to receive audio over any suitable wireless connection, such as over a connection to a local area network (e.g., via a connection that complies with one of the IEEE 802.11x family of protocols which are sometimes referred to as Wi-Fi connections), or a wireless connection between external sound system 106 and computing device 102, such as an ad hoc wireless network connection, a short-range wireless communication protocol (e.g., Bluetooth, Bluetooth Low Energy, Wireless USB, etc.), etc.

In some implementations, computing device 102 can be connected to external sound system 106 by a connection 110. Computing device 102 and external sound system 106 can be connected using any suitable technique(s). For example, connection 110 can include a suitable cable, such as a stereo cable, an RCA cable, an HDMI cable, that can be connected between output port 104 and a port of external audio system 106. As another example, connection 110 can include a wireless connection, such as a connection to a local area network (e.g., via a Wi-Fi connection), or a wireless connection established between computing device 102 and external sound system 106, such as an ad hoc wireless network connection, a short-range wireless communication protocol (e.g., Bluetooth, Bluetooth Low Energy, Wireless USB, etc.), etc. Additionally or alternatively, media streaming device 102 can be included as hardware and/or software of external sound system 106.

In some implementations, computing device 102 can be coupled to a user device 112 using a communications link 114. User device 112 can be any suitable device, such as a smartphone, a tablet computer, a wearable computer, a laptop computer, a personal computer, an electronic reader, a digital media receiver, a smart television, a game console, any other suitable computing device, or any suitable combination thereof. In some implementations, communications link 114 can include any suitable communications link, for example, as described below in connection with FIG. 2. Additionally, communications link 114 can include a network, such as a local area network (LAN) having wired and/or wireless connections. Additionally or alternatively, communications link 114 can include a wireless connection between user device 112 and computing device 102, such as an ad hoc wireless network connection, a short-range wireless communication protocol (e.g., Bluetooth, Bluetooth Low Energy, Wireless USB, etc.), etc. In some implementations, communications between user device 112 and computing device 102 over communications link 114 can be encrypted using any suitable encryption technique(s). For example, messages sent from user device 112 to computing device 102 can be encrypted using any suitable encryption scheme, for example, using a public key-private key pair for encryption and decryption of messages. As another example, communications over communications link 114 can be encrypted using Transport Layer Security (TLS).

In some implementations, user device 112 can include a display 116 for presenting a user interface to a user. In some examples described herein, user device 112 can be a mobile computing device such as a smartphone or a tablet computer, and display 116 can include a touchscreen for receiving input and displaying a user interface and/or media content to a user.

In some implementations, computing device 102 and/or user device 112 can communicate with a content discovery server 122 over a communications link 126. Computing device 102 and/or user device 112 can communicate with content discovery server 122 to discover and/or browse content made available by a content delivery server 120. For example, a user can use user device 112 to find media content to be presented by interacting with content discovery server 122. In some implementations, such media content can be presented using display 116, one or more speakers, an audio output (e.g., a 3.5 mm jack), any other suitable presentation device, or any suitable combination thereof. In some implementations, user device 112 can present a media content item that was selected using content discovery server 122, by requesting the media content item from content delivery server 120 and receiving the media content item over a communications link 124. In some implementations, each of content delivery server 120 and/or content discovery server 122 can be implemented on any suitable number of servers. Additionally or alternatively, in some implementations, the functions performed by content delivery server 120 and content discovery server 122 can be performed by the same device (e.g., by a common server computer). In some implementations, multiple content delivery servers can provide content to user device 112 in response to a request for content. For example, in response to a request for a particular media content item from user device 112, content delivery server 120 can cause an advertisement to be provided to user device 112 prior to, during and/or after the requested content item is presented. In such an example, the server that provides the advertisement can be separate from the server that provides the requested media content item.

In some implementations, communications links 124 and/or 126 can include a local area network (e.g., a home network) and/or a non-local network (e.g., the Internet). For example, computing device 102 and/or user device 112 can be connected to a common LAN such as a home network, and can connect to content discovery server 122 and/or content delivery server 120 through the Internet. As another example, content delivery server 120 and/or content discovery server 122 can be connected to a LAN that is common to computing device 102 and/or user device 112. In a more particular example, content delivery server 120 and/or content discovery server 122 can be located remotely from computing device 102 and/or user device 112, and communications links 124 and/or 126 can include a non-local network such as the Internet for accessing content from content delivery server 120 and/or discovering content using content discovery server 122. In another more particular example, content delivery server 120 and/or content discovery server 122 can be located locally to computing device 102 and/or user device 112, and communications links 124 and/or 126 can include a local network, such as a home network, to which content delivery server 120 and/or content discovery server 122 are connected. In such an example, a non-local network of communications links 124 and/or 126 (if it exists) may not be used when accessing content from content delivery server 120 and/or discovering content using content discovery server 122.

In some implementations, a user of user device 112 can cause media content made available by content delivery server 120 to be transmitted to computing device 102, which can, in turn, present the media content using a speaker integrated in computing device 102 and/or output the media content to external sound system 106.

In some implementations, a user of computing device 102 can interact with computing device 102 to request media content. For example, computing device 102 can receive record an audio signal and determine that a user said one or more words, can interpret the words as an instruction to request media content, and can take one or more actions based on the instruction.

In some implementations, when a media content item is to be presented from content delivery server 120 using computing device 102, the media content item can be transmitted to computing device 102 over a communications link 128. Communications link 128 can include a local area network (e.g., a home network) and/or a non-local network (e.g., the Internet). For example, computing device 102 and user device 112 can both be connected to a common LAN such as a home network, and can connect to content delivery server 120 through the Internet. As another example, content delivery server 120 can be connected to a LAN that is common to user device 112 and/or computing device 102. In a more particular example, content delivery server 120 can be located remotely from computing device 102 and/or user device 112, and communications link 128 can include a non-local network such as the Internet for accessing content from content delivery server 120. In another more particular example, content delivery server 120 can be located locally to computing device 102 and/or user device 112, and communications link 128 can include a local network, such as a home network, to which both computing device 102 and content delivery server 120 are connected. In such an example, a non-local network of communications link 128 (if it exists) may not be used when accessing content from content delivery server 120.

In some implementations, a user can choose a media content item to be presented using computing device 102 from a memory of user device 112 (e.g., the user can choose a video that is stored locally on user device 112). Additionally or alternatively, a user can choose a media content item to be presented using computing device 102 that is stored on another computing device present on the same local area network (e.g., network attached storage, a memory of a personal computer on a home network, memory on a server on the same network, etc.). Such a media content item stored on a computing device connected to a local area network can be transmitted from user device 112 to computing device 102 over communications link 114 (or any other suitable communications link), without being transmitted through content delivery server 120.

Figure 2:
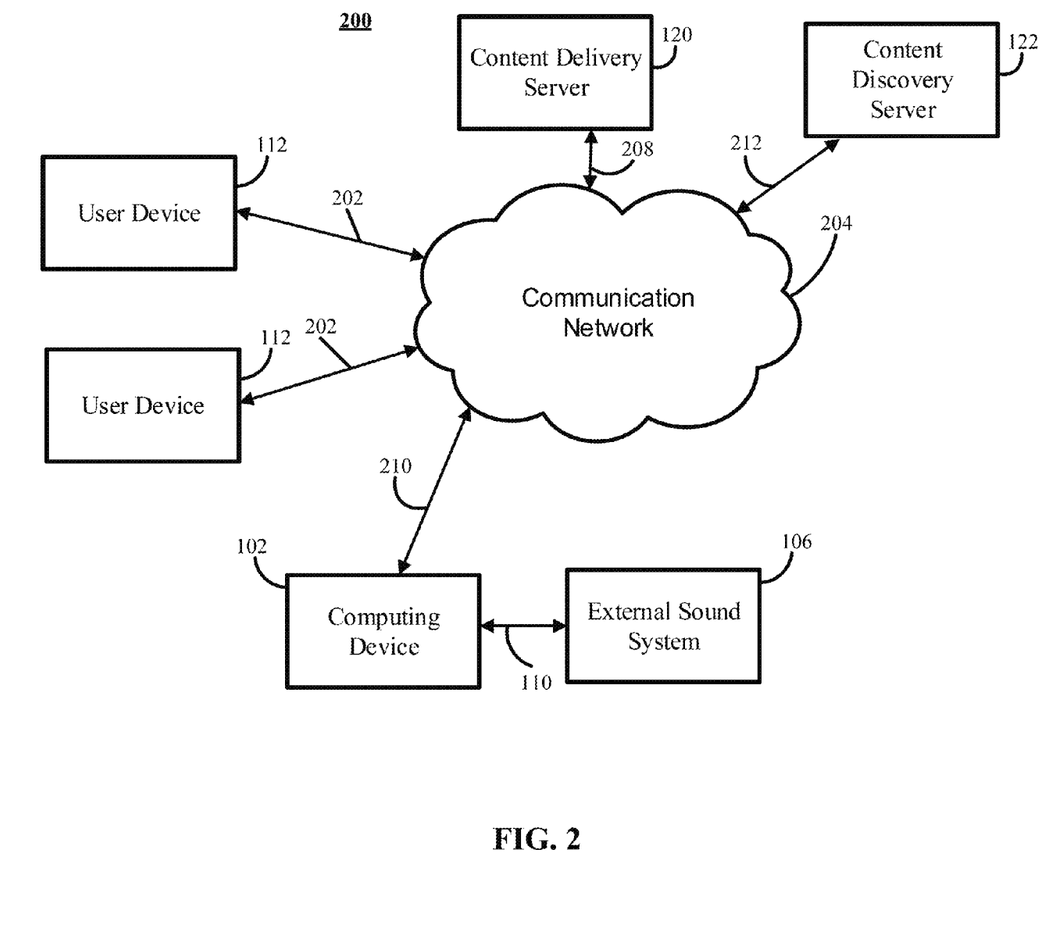
FIG. 2 shows an example of a generalized schematic diagram of a system on which the mechanisms for controlling audio output as described herein can be implemented in accordance with some implementations of the disclosed subject matter.

FIG. 2 shows an example 200 of a generalized schematic diagram of a system on which the mechanisms for controlling audio output as described herein can be implemented in accordance with some implementations of the disclosed subject matter. As illustrated, system 200 can include one or more user devices 112. User devices 112 can be local to each other or remote from each other. User devices 112 can be connected by one or more communications links 202 to a communications network 204 that can be linked via a communications link 210 to computing device(s) 102, via a communications link 208 to content delivery server 120, via a communications link 212 to content discovery server 122, and via communications links 202 to other user devices 112.

In some implementations, each of the user devices 112, content delivery server 120, content discovery server 122 and computing device 102 can be any of a general purpose device such as a computer or a special purpose device such as a client, a server, etc. Any of these general or special purpose devices can include any suitable components such as a hardware processor (which can be a microprocessor, digital signal processor, a controller, a field-programmable gate array, a complex programmable logic device, an application-specific integrated circuit, etc.), memory, communication interfaces, display controllers, input devices, etc. For example, user device 112 can be implemented as a smartphone, a tablet computer, a wearable computer, a personal computer, a laptop computer, a gaming console, a digital media receiver, a set-top box, a smart television, a server, etc. As another example, computing device 102 can be implemented as a wireless speaker, a voice command device, a device that provides a digital assistant service, a personal computer, a laptop computer, a gaming console, a smart television, a smartphone, a tablet computer, a wearable computer, a digital media receiver, a set-top box, a smart television, a server, any suitable home automation device that is connected to and/or can connect to an internal and/or external speaker, etc.

Communications network 204 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 202, 208, 210 and 212 can be any communications links suitable for communicating data among user devices 112, computing device 102, content delivery server 120, and content discovery server 122, such as network links, dial-up links, wireless links, hard-wired links, any other suitable communications links, or any suitable combination of such links. User devices 112 can discover, browse, download, stream, store, playback, transmit, and/or otherwise present content stored locally at user device 112 and/or stored remotely at content delivery server 120 using any suitable technique(s). Additionally, in some implementations, computing device 102 can discover, browse, download, stream, store, playback, transmit, and/or otherwise present content stored locally at computing device 102 and/or stored remotely at content delivery server 120 using any suitable technique(s).

System 200 can include computing device 102 as described above in connection with FIG. 1, and can include an application installed on and/or executed by on one or more of external sound systems 106, which can replicate the functions of computing device 102 described herein.

System 200 can include one or more content delivery servers 120. Content delivery server 120 can be any suitable server for providing access to media content items in accordance with the mechanisms described herein, such as a processor, a computer, a data processing device, and/or any suitable combination of such devices.

System 200 can include one or more content discovery servers 122. Content discovery server 122 can be any suitable server for facilitating discovery and/or browsing of media content items accessible on content delivery server 120 in accordance with the mechanisms described herein, such as a processor, a computer, a data processing device, and/or any suitable combination of such devices.

In some implementations, communications link 114 described above in connection with FIG. 1 can include communications link 202, communication network 204, and communications link 210; communications link 126 described above in connection with FIG. 1 can include communications link 202 and/or 210, communication network 204, and communications link 212; and communications link 124 described above in connection with FIG. 1 can include communications link 202 and/or 210, communication network 204, and communications link 208.

Figure 3:
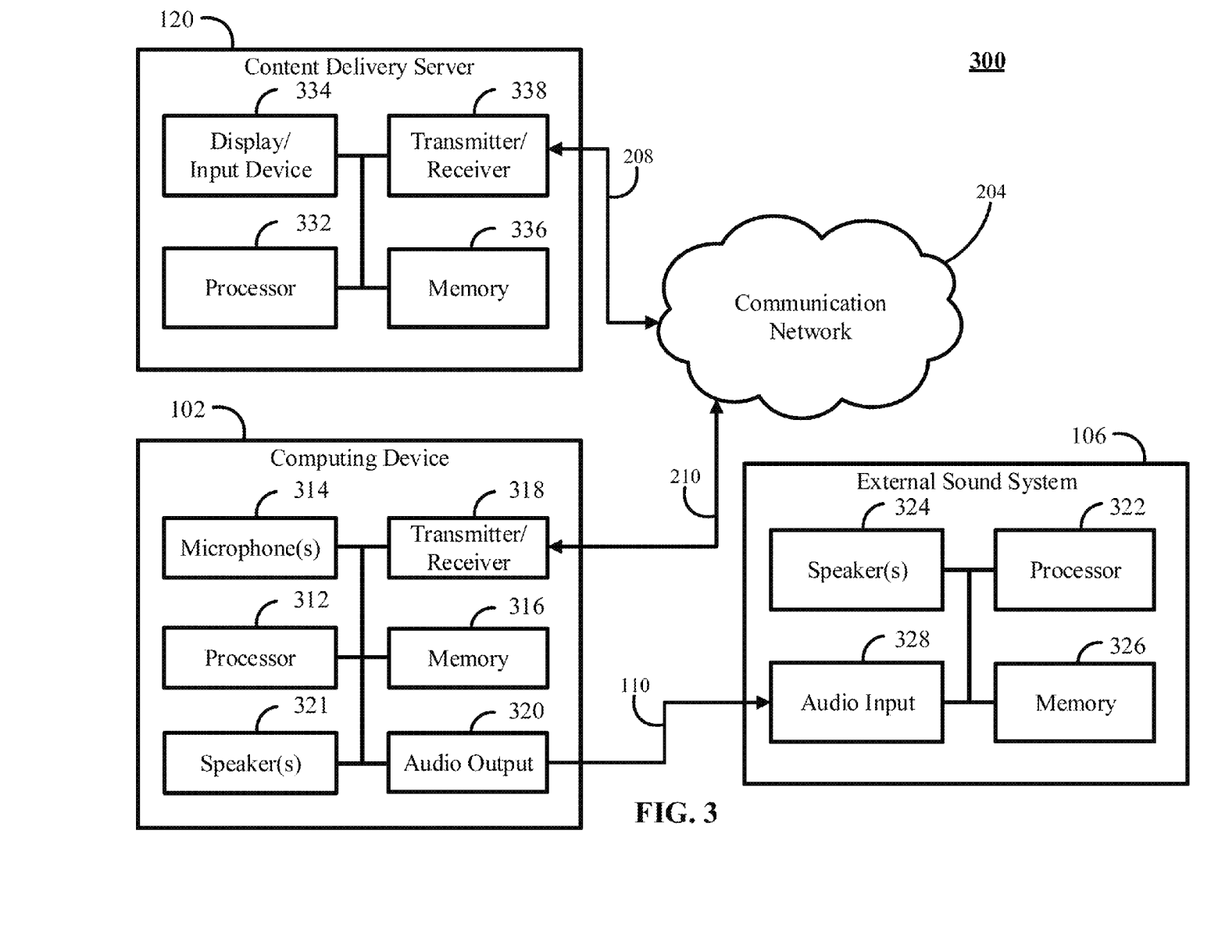
FIG. 3 shows an example of hardware that can be used to implement one of the computing devices, the external sound system and the content delivery server depicted in FIG. 2 in accordance with some implementations of the disclosed subject matter.

FIG. 3 shows an example 300 of hardware that can be used to implement one of computing devices 102, external sound system 106 and content delivery server 120 depicted in FIG. 2 in accordance with some implementations of the disclosed subject matter. Referring to FIG. 3, computing device 102 can include a hardware processor 312, one or more microphones 314, memory 316, a transmitter/receiver 318, one or more audio output ports 320 and/or one or more speakers 321 which can be interconnected. In some implementations, memory 316 can include a storage device (such as a non-transitory computer-readable medium) for storing a computer program for controlling hardware processor 312.

Hardware processor 312 can use the computer program to present and/or record audio using microphone(s) 314 and/or to interact with a user (e.g., by capturing words spoken by the user using microphone(s) 314 and/or by presenting audio using speaker(s) 321) to allow a user to, among other things, request media content to be presented using computing device 102. It should also be noted that data received through communications link 210, and/or any other communications links can be received from any suitable source. In some implementations, hardware processor 312 can send and receive data through communications link 210, communications link 114, communications link 124, communications link 126, connection 110, and/or any other communications links using, for example, a transmitter, receiver, transmitter/receiver, transceiver, or any other suitable communication device, such as transmitter/receiver 318. Microphone(s) 314 can include any suitable number and/or type of microphones. Transmitter/receiver 318 can include any suitable transmitter and/or receiver for transmitting and/or receiving, among other things, media content including audio and/or video content. Audio output 320 can include any suitable audio port or audio ports (and/or video ports in some implementations) for outputting audio to an external sound system (e.g., external sound system 106). For example, as described above in connection with FIG. 1, audio output 320 can include a 3.5 mm jack that accepts a 3.5 mm connector, a fiber optic audio port (e.g., that accepts a TOSLINK connector), an RCA jack, a High-Definition Multimedia Interface (HDMI) port, a Universal Serial Bus (USB) port (e.g., a USB 2.x port, a USB 3.x port, etc.), a THUNDERBOLT port, any other suitable port and/or any suitable combination of ports. Speaker(s) 321 can include any suitable number and/or type of speakers for presenting audio and/or providing audio feedback to a user. In some implementations, internal speaker(s) 321 can be omitted and/or computing device 102 can output audio to any other suitable device that can output audio. For example, in such implementations, computing device can output audio to another device to which it is connected by wire and/or wirelessly, such as a standalone speaker (e.g., connected by a speaker wire), a user device having an internal speaker (e.g., a smartphone, a tablet computer, etc.), a computer having external speakers that is connected to the same local area network, a wireless speaker to which computing device 102 can connect (e.g., by Bluetooth connection), etc.

External sound system 106 can include a hardware processor 322, one or more speakers 324, memory 326, and one or more audio inputs 328, which can be interconnected. In some implementations, memory 326 can include a storage device (such as a non-transitory computer-readable medium) for storing a computer program for controlling hardware processor 322.

Hardware processor 322 can use the computer program to present audio received via audio input 328 and/or from any other source (e.g., from an internal or external antenna that can be used to receive audio broadcast over the air).

Content delivery server 120 can include a hardware processor 332, a display/input device 334, memory 336, and a transmitter/receiver 338, which can be interconnected. In some implementations, memory 336 can include a storage device (such as a non-transitory computer-readable medium) for storing a server program for controlling hardware processor 332.

Hardware processor 332 can use the server program to communicate with user device 112 and/or computing device 102, as well as provide access to media content. It should also be noted that data received through communications link 208 or any other communications links can be received from any suitable source. In some implementations, hardware processor 332 can send and receive data through communications link 208 or any other communication links using, for example, a transmitter, receiver, transmitter/receiver, transceiver, or any other suitable communication device, such as transmitter/receiver 338. In some implementations, hardware processor 332 can receive commands and/or values transmitted by one or more users. Display/input device 334 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 318 can include any suitable transmitter and/or receiver for transmitting and/or receiving, among other things, media content including audio and/or video content.

In some implementations, content delivery server 120 can be implemented in one server or can be distributed as any suitable number of servers. For example, multiple servers 120 can be implemented in various locations to increase reliability and/or increase the speed at which server 120 can communicate with user devices 112 and/or computing device 102.

In some implementations, content discovery server 122 can be implemented using similar hardware to content delivery server 120, but can include a server program for facilitating discovery and/or browsing of media content items accessible from content delivery server 120.

Figure 4:
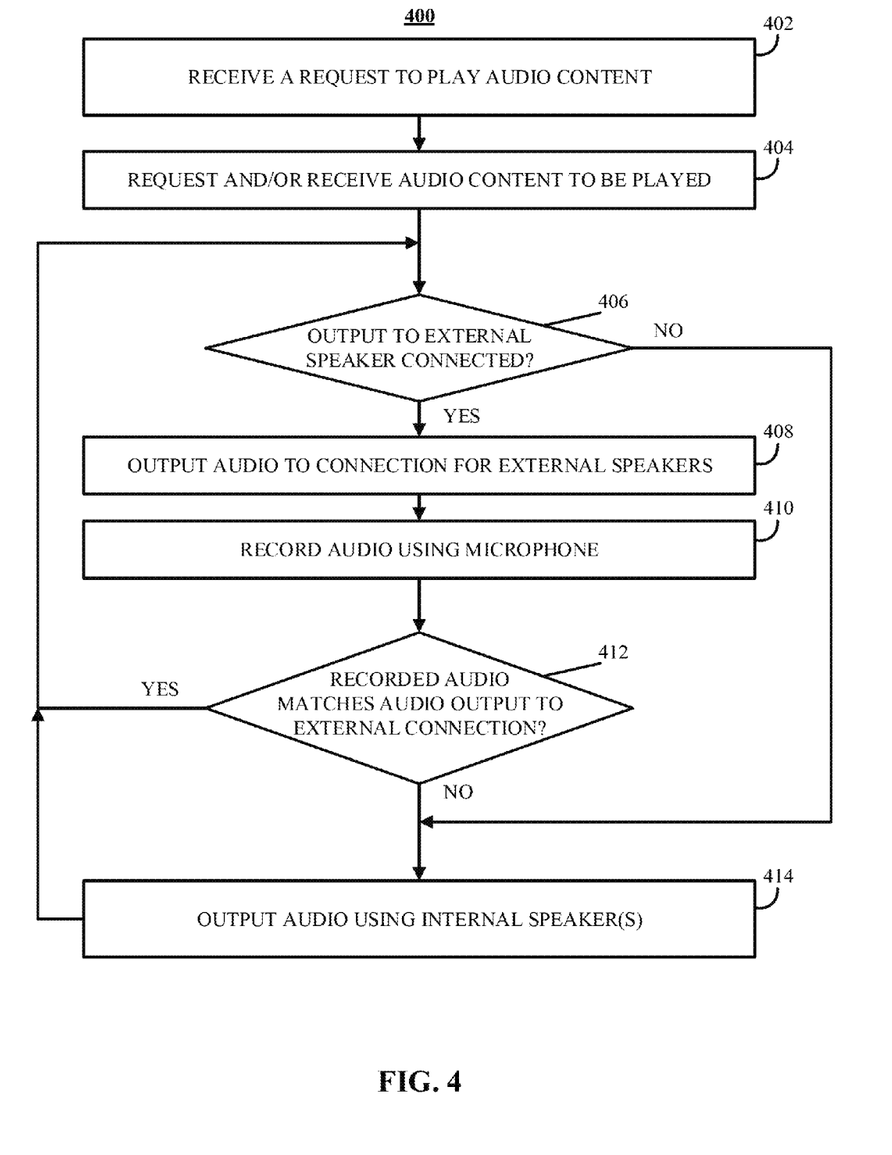
FIG. 4 shows an example of a process for controlling audio output in accordance with some implementations of the disclosed subject matter.

FIG. 4 shows an example 400 of a process for controlling audio output in accordance with some implementations of the disclosed subject matter. At 402, process 400 can receive a request to present audio content. In some implementations, the request to present audio content can be received from any suitable source and/or can be received using any suitable technique or combination of techniques. For example, in some implementations, process 400 can receive the request to present audio content from a user device (e.g., user device 112), with identifying information (e.g., a URL) that computing device 102 can use to request the audio content. As another example, in some implementations, process 400 can receive the request to present audio content as spoken words that are recorded by microphone 314 and converted into one or more instructions by hardware processor 312 (and/or any other suitable processor, such as a processor of a server with which computing device 102 can communicate to interpret spoken user instructions). In such an example, the request spoken by the user can be a request to present particular audio content (e.g., the name of an artist, an author, a title of a song or book, etc.), a request to present content using a particular application, a request to present a particular type of content (e.g., a particular genre), any other suitable request for content, and/or any suitable combination thereof. As yet another example, process 400 can receive a request to present content pushed to computing device 102 by another device (e.g., content delivery server 120, user device 112, etc.). In such an example, the device pushing the content can send a request to computing device 102 to play the content over any suitable communications link such as the Internet, a local area network (e.g., Wi-Fi), a short range wireless connection (e.g., Bluetooth), any other suitable communications link, or any suitable combination of communications links.

At 404, process 400 can request and/or receive the audio content that was requested to be presented at 402. In some implementations, process 400 can use any suitable technique or combination of techniques to request and/or receive the audio content requested to be presented at 402. For example, process 400 can request the content using an address (e.g., a URL) provided by user device 112. As another example, process 400 can request the content by determining a search query and/or instruction based on one or more words spoken by a user, and can use the search query and/or instruction to request content responsive to the one or more words spoken by the user. As yet another example, process 400 can receive audio content pushed by another device (e.g., user device 112, content delivery server 120, etc.).

At 406, process 400 can determine whether an output to an external sound system (e.g., external sound system 106) is connected. In some implementations, process 400 can use any suitable technique or combination of techniques to determine whether an output to an external sound system is connected. For example, process 400 can determine whether an audio output port (e.g., connector 104) is connected to a corresponding plug. In a more particular example, process 400 can determine whether a 3.5 mm plug is inserted into the 3.5 mm jack. In such examples, process 400 can use any suitable technique or combination of techniques to determine that a plug is inserted into an output port, such as determining whether a metal contact of the plug is present in the output port. In another more particular example, process 400 can determine whether a particular signal is received at a contact of the output port, such as a hot plug detect signal that is output on pin 18 of an HDMI port and received back at pin 19 of the HDMI port when an HDMI sink is connected to the HDMI port (e.g., via an HDMI cable). As another example, computing device 102 can determine whether audio content is being output over a wireless connection that is used to transmit audio content to external sound system 106.

If process 400 determines that there is no output to external sound system 106 connected ("NO" at 406), process 400 can proceed to 414, and output audio using one or more internal speakers (e.g., speaker(s) 321). Otherwise, if process 400 determines that an output to external sound system 106 is connected ("YES" at 406), process 400 can proceed to 408.

At 408, process 400 can output the audio received at 404 over the connection to external sound system 106 that is connected. In some implementations, process 400 can inhibit the audio being output over the connection to external sound system 106 from also being presented using speaker(s) 321. Additionally, in some implementations, process 400 can output the audio over only a single output port in cases in which multiple output ports are present and connected to external sound systems (which may be the same external sound system 106 or different external sound systems). Alternatively, in some implementations, process 400 can output the audio over any output ports for which a connection is detected. In such implementations, the audio output over different output ports can be output with different timing in situations in which different external sound systems exhibit different delays.

At 410, process 400 can record one or more audio samples using microphone 314, which can be used to determine whether the audio being output at 408 is being presented by an external speakers (e.g., speaker(s) 324 of external sound system 106). In some implementations, process 400 can record any suitable amount of audio and/or any suitable frequencies of audio for comparison with the audio output at 408. For example, process 400 can cause the audio to be continuously recorded, and can use a particular portion of the recorded audio to compare to the audio output at 408 (e.g., as described below in connection with 412). As another example, process 400 can record samples at discrete time intervals, without recording signals from sounds that occur between the time intervals (e.g., process 400 can capture samples every quarter second, every fifth of a second, etc.). As yet another example, process 400 can record audio at particular frequencies (e.g., by filtering out or otherwise discarding audio at other frequencies).

In some implementations, signals recorded at 410 and signals recorded in order to determine whether the user has issued voice commands are deleted, overwritten and/or otherwise disposed of when computing device 102 has used the signal (e.g., to determine whether audio is being played by an external speaker, whether the user has issued a voice command, etc.). Additionally, in some implementations, microphone 314 can be disabled when not in use and/or and signals output by microphone 314 can be disregarded (e.g., never recorded in memory 316) when the user has not requested that the signals be recorded. For example, in some implementations, signals from microphone 314 can be recorded (e.g., in memory 316) when audio content is being output using audio output 320 in order to determine whether external sound system 106 is presenting the audio content. As another example, signals from microphone 314 can be recorded (e.g., in memory 316) when the user is giving a voice command in order to determine one or more instructions based on the voice command. In such an example, a user can be required to say a particular word or combination of words (e.g., a trigger word or trigger phrase) and/or perform some other recognized action, such as pressing a physical button to initiate recording of subsequent words that are to constitute a voice command. Until the trigger word or trigger phrase is recognized, signals from microphone 314 can be discarded.

At 412, process 400 can determine whether the audio recorded at 410 matches the audio output at 408. Process 400 can use any suitable technique or combination of technique to determine whether the recorded audio matches the outputted audio. For example, in some implementations, process 400 (and/or any other suitable process) can generate one or more audio fingerprints based on the recorded audio, and compare the generated fingerprints to one or more audio fingerprints of the audio being output at 408. In such an example, the fingerprints of the recorded audio and/or the fingerprints of the outputted audio can be generated by computing device 102 and/or can be generated by a remote computer (e.g., a remote server). In some implementations, the fingerprints of the outputted audio can be generated as the audio is output. Additionally or alternatively, the fingerprints of the outputted audio can be generated prior to the content being output (e.g., in a database of known audio content), and the fingerprints of the recorded audio can be compared to fingerprints from the previously generated fingerprints.

As another example, in some implementations, process 400 (and/or any other suitable process) can compare the recorded audio signal to the outputted audio signal to determine whether the signals match. In a more particular example, process 400 can take a difference between the recorded audio signal and the outputted audio signal. In such a more particular example, if the result of the difference is below a threshold, process 400 can determine that the outputted signal and the recorded signal match. In some implementations, delays caused by transmitting the audio signal to external sound system 106, delays caused by external sound system 106 and/or delays introduced when recording the audio content can cause a comparison between the audio currently being output and the recorded audio to be different regardless of whether the audio is being presented by external sound system 106. In some implementations, process 400 can compare the recorded audio to a time-delayed version of the signal that was output to external sound system 106. Process 400 can use any suitable technique or combination of techniques to determine the amount of delay, such as by matching a pattern of local maxima from both signals to attempt to match the timing of the signals, by comparing the recorded signal to versions of the output signal with multiple different amounts of delay, by determining the delay between the output audio and the recorded audio once (e.g., using a calibration process) and using the determined delay, etc. In some implementations, process 400 (and/or any other suitable process) can compensate for background noise captured in the recording using any suitable technique or combination of techniques, such as by filtering the audio signal based on the known signal (e.g., the output audio signal). Note that in most cases the recorded audio will not match the output audio exactly (e.g., due to the hardware being used to play the audio, the hardware being used to record the audio, ambient noise, the acoustics or the room, etc.), and accordingly, process 400 can determine whether the recorded audio is substantially similar to the output audio signal. For example, process 400 (and/or any other suitable process) can determine a confidence value that represents how closely the recorded audio matches the output signal. In such an example, if the confidence value is greater than a threshold value, process 400 can determine that the recorded audio matches the audio being output.

In some implementations, process 400 can alter the audio signal output at 408 to generate a modified audio signal. In such implementations, process 400 can introduce one or more signals or alterations to the existing signal to increase the likelihood that the recorded audio signal can be recognized without substantially changing how the output audio signal sounds to most human listeners. For example, process 400 can add a signal having a particular pattern at a frequency that can be output by most external speakers, but that is outside of the range of human hearing. As another example, process 400 can change the amplitude of the signal in a particular pattern such that it is unlikely to be observed by a listener, but recognizable by process 400 (and/or any other suitable process). In such implementations, process 400 can determine whether the pattern of the inserted signal and/or the change in amplitude is present in the recorded signal to determine whether the outputted audio signal is being presented by external audio system 106.

If process 400 determines that the recorded audio matches the outputted audio signal ("YES" at 412), process 400 can return to 406 and can continue to output the audio if the output to the external sound system is connected.

Otherwise, if process 400 determines that the recorded audio does not match the outputted audio signal ("NO" at 412), process 400 can proceed to 414. At 414, process 400 can output the audio signal using speaker(s) 321, and can return to 406 to determine whether an output to an external audio system is connected. The recorded audio may not match the outputted audio signal for various reasons, such as the external sound system being powered down, a different input of the external sound system being selected, the output not being connected to the external audio system, a malfunction, etc.

In some implementations, during periods when process 400 is presenting audio content using speaker(s) 321 at 414, process 400 can provide audio to audio output 320 such that, if and when external sound system 106 becomes configured to present audio content, process 400 can provide the audio content at 408 and inhibit presentation of the audio content by speaker(s) 321 at 414. In some implementations, process 400 can provide any suitable audio to audio output 320 at 414. For example, an audio signal outside the range of human hearing can be provided, and process 400 can determine, at 412, whether that signal is present in audio recorded at 410. As another example, the audio content received at 404 can be provided. In such an example, in cases in which the audio content is provided to audio output 320, the audio content may be presented by both the internal speaker and the external speakers (e.g., speaker(s) 324 of external sound system 106) with a delay between the two, and both may be present in audio recorded at 410. In some implementations, process 400 (and/or any other suitable process) can use any suitable technique or combination of techniques to distinguish between the audio presented by speaker(s) 321 and speaker(s) 324. For example, in some implementations, process 400 can subtract the signal provided to speaker(s) 321 from the recorded signal based on a known timing relationship between when audio is presented by speaker(s) 321 and when that same audio is recorded by microphone 314. As another example, multiple microphones 314 can record sound, and can be placed in relation to speaker(s) 321 such that the signals from the multiple microphones can be modified and/or combined (e.g., by subtracting the output of one microphone from the output of another, by inverting the output from one microphone and adding it to another, etc.) such that the signal provided to speaker(s) 321 is removed. In such an example, the residual signal can be used to determine whether the audio content is present in the recorded signal as presented by external sound system 106.

In some implementations, process 400 can be used for some audio to be presented and not for other audio to be presented. For example, in some implementations, audio that is output to interact with a user (e.g., prompts, queries, responses to queries, etc.) can always be presented using only speaker(s) 321.

In some implementations, the mechanisms described herein, can include server-side software, server-side hardware, client-side software, client-side hardware, or any suitable combination thereof. For example, the mechanisms can encompass a computer program written in a programming language recognizable by hardware processor 312, hardware processor 322, and/or hardware processor 332 (e.g., a program written in a programming language, such as, Java, C, Objective-C, C++, C#, Javascript, Visual Basic, or any other suitable approaches). As another example, the applications can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIG. 4 can be executed or performed in any order or sequence not limited to the order and sequence shown and described in the figures. Also, some of the above steps of the processes of FIG. 4 can be executed or performed substantially simultaneously where appropriate or in parallel to reduce latency and processing times.

It should also be noted that, as used herein, the term mechanism can encompass hardware, software, firmware, or any suitable combination thereof.

Accordingly, systems, methods, and media for controlling audio output are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for controlling audio output, comprising:
receiving, by a computing device having an output port for transmitting audio information, a microphone for capturing audio information, and a hardware processor, audio content to be presented;
detecting, using the hardware processor, that the output port of the computing device is connected to a corresponding connector that communicates audio information with an external speaker;
in response to detecting that the output port is connected to the corresponding connector, providing, using the hardware processor, the audio content at the output port to the external speaker;
causing the microphone associated with the computing device to capture a first audio clip at a first time to determine whether the audio content that has been transmitted to the external speaker through the output port is being played back by the external speaker;
determining, using the hardware processor, whether the first audio clip captured at the first time matches the audio content that has been transmitted to the external speaker through the output port;
in response to determining that the first audio clip captured at the first time does not match the audio content that has been transmitted to the external speaker through the output port, inhibiting, using the hardware processor, the audio content from being provided at the output port to the external speaker and automatically switching the audio content to be presented using a speaker of the computing device;
subsequent to determining that the first audio clip captured at the first time matches the audio content that has been transmitted to the external speaker through the output port, causing, using the hardware processor, the audio content to be presented at the output port to the external speaker;
causing the microphone associated with the computing device to capture a second audio clip at a second time to determine whether the audio content that has been transmitted to the external speaker through the output port continues to be played back by the external speaker;
determining, using the hardware processor, that the second audio clip captured at the second time does not match the audio content that has been transmitted to the external speaker through the output port; and
in response to determining that the second audio clip captured at the second time does not match the audio content that has been transmitted to the external speaker through the output port, inhibiting the audio content from being provided at the output port to the external speaker and automatically switching the audio content to be presented using the speaker of the computing device.

2. The method of claim 1, further comprising:
determining that the output port is no longer connected to the corresponding connector; and
in response to determining that the output port is no longer connected to the corresponding connector, inhibiting the audio content from being provided to the output port.

3. The method of claim 1, wherein determining that the first audio clip captured at the first time matches the audio content that has been transmitted to the external speaker through the output port comprises:
generating an audio fingerprint based on the first audio clip captured at the first time;
determining that the audio fingerprint based on the first audio clip captured at the first time matches an audio fingerprint generated based on the audio content that has been transmitted to the external speaker through the output port; and
in response to determining that the audio fingerprint based on the first audio clip captured at the first time matches an audio fingerprint generated based on the audio content that has been transmitted to the external speaker through the output port, determining that first audio clip captured at the first time contains the audio content that has been transmitted to the external speaker through the output port.

4. The method of claim 1, wherein determining that the first audio clip captured at the first time matches the audio content that has been transmitted to the external speaker through the output port comprises:
  calculating a difference between a portion of the audio content that has been transmitted to the external speaker through the output port and the first audio clip captured at the first time; and
  determining that the first audio clip captured at the first time contains the audio content that has been transmitted to the external speaker through the output port based on the difference.

5. The method of claim 1, wherein the output port is a 3.5 millimeter jack.

6. The method of claim 1, further comprising in response to determining that the first audio clip captured at the first time matches the audio content that has been transmitted to the external speaker through the output port, inhibiting the audio content from being presented using the speaker of the computing device.

7. A system for controlling audio output, comprising:
  a computing device comprising:
    an output port;
    a microphone;
    a speaker; and
    a hardware processor that is programmed to:
      receive audio content to be presented;
      detect that the output port of the computing device is connected to a corresponding connector that communicates audio information with an external speaker;
      in response to detecting that the output port is connected to the corresponding connector, provide the audio content at the output port to the external speaker;
      cause the microphone associated with the computing device to capture a first audio clip at a first time to determine whether the audio content that has been transmitted to the external speaker through the output port is being played back by the external speaker;
      determine whether the first audio clip captured at the first time matches the audio content that has been transmitted to the external speaker through the output port;
      in response to determining that the first audio clip captured at the first time does not match the audio content that has been transmitted to the external speaker through the output port, inhibit the audio content from being provided at the output port to the external speaker and automatically switch the audio content to be presented using the speaker of the computing device;
      subsequent to determining that the audio content the first audio clip captured at the first time matches the audio content that has been transmitted to the external speaker through the output port, cause the audio content at the output port to the external speaker;
      cause the microphone associated with the computing device to capture a second audio clip at a second time to determine whether the audio content that has been transmitted to the external speaker through the output port continues to be played back by the external speaker;
      determine that the second audio clip captured at the second time does not match the audio content is not present in the second portion of audio that has been transmitted to the external speaker through the output port; and
      in response to determining that the second audio clip captured at the second time does not match the audio content that has been transmitted to the external speaker through the output port, inhibit the audio content from being provided at the output port to the external speaker and automatically switch the audio content to be presented using the speaker of the computing device.

8. The system of claim 7, wherein the hardware processor is further programmed to:
  determine that the output port is no longer connected to the corresponding connector; and
  in response to determining that the output port is no longer connected to the corresponding connector, inhibit the audio content from being provided to the output port.

9. The system of claim 7, wherein the hardware processor is further programmed to:
  generate an audio fingerprint based on the first audio clip captured at the first time;
  determine that the audio fingerprint based on the first audio clip captured at the first time matches an audio fingerprint generated based on the audio content that has been transmitted to the external speaker through the output port; and
  in response to determining that the audio fingerprint based on the first audio clip captured at the first time matches an audio fingerprint generated based on the audio content that has been transmitted to the external speaker through the output port, determine that first audio clip captured at the first time contains the audio content that has been transmitted to the external speaker through the output port.

10. The system of claim 7, wherein the hardware processor is further programmed to:
  calculate a difference between a portion of the audio content that has been transmitted to the external speaker through the output port and the first audio clip captured at the first time; and
  determine that the first audio clip captured at the first time contains the audio content that has been transmitted to the external speaker through the output port based on the difference.

11. The system of claim 7, wherein the output port is a 3.5 millimeter jack.

12. The system of claim 7, hardware processor is further programmed to inhibit the audio content from being presented using the speaker of the computing device in response to determining that the first audio clip captured at the first time matches the audio content that has been transmitted to the external speaker through the output port.

13. A non-transitory computer-readable medium containing computer executable instructions that, when executed by a processor, cause the processor to perform a method for controlling audio output, the method comprising:
  receiving, by a computing device having an output port for transmitting audio information and a microphone for capturing audio information, audio content to be presented;
  detecting that the output port of the computing device is connected to a corresponding connector that communicates audio information with an external speaker;
  in response to detecting that the output port is connected to the corresponding connector, providing the audio content at the output port to the external speaker;

causing the microphone associated with the computing device to capture a first audio clip at a first time to determine whether the audio content that has been transmitted to the external speaker through the output port is being played back by the external speaker;

determining whether the first audio clip captured at the first time matches the audio content that has been transmitted to the external speaker through the output port;

in response to determining that the first audio clip captured at the first time does not match the audio content that has been transmitted to the external speaker through the output port, inhibiting the audio content from being provided at the output port to the external speaker and automatically switching the audio content to be presented using a speaker of the computing device;

subsequent to determining that the first audio clip captured at the first time matches the audio content that has been transmitted to the external speaker through the output port, causing the audio content to be presented at the output port to the external speaker;

causing the microphone associated with the computing device to capture a second audio clip at a second time to determine whether the audio content that has been transmitted to the external speaker through the output port continues to be played back by the external speaker;

determining that the second audio clip captured at the second time does not match the audio content that has been transmitted to the external speaker through the output port; and in response to determining that the second audio clip captured at the second time does not match the audio content that has been transmitted to the external speaker through the output port, inhibiting the audio content from being provided at the output port to the external speaker and automatically switching the audio content to be presented using the speaker of the computing device.

14. The non-transitory computer-readable medium of claim 13, wherein the method further comprises:
   determining that the output port is no longer connected to the corresponding connector; and
   in response to determining that the output port is no longer connected to the corresponding connector, inhibiting the audio content from being provided to the output port.

15. The non-transitory computer-readable medium of claim 13, wherein determining that the first audio clip captured at the first time matches the audio content that has been transmitted to the external speaker through the output port comprises:
   generating an audio fingerprint based on the first audio clip captured at the first time;
   determining that the audio fingerprint based on the first audio clip captured at the first time matches an audio fingerprint generated based on the audio content that has been transmitted to the external speaker through the output port; and
   in response to determining that the audio fingerprint based on the first audio clip captured at the first time matches an audio fingerprint generated based on the audio content that has been transmitted to the external speaker through the output port, determining that first audio clip captured at the first time contains the audio content that has been transmitted to the external speaker through the output port.

16. The non-transitory computer-readable medium of claim 13, wherein determining that the first audio clip captured at the first time matches the audio content that has been transmitted to the external speaker through the output port comprises:
   calculating a difference between a portion of the audio content that has been transmitted to the external speaker through the output port and the first audio clip captured at the first time; and
   determining that the first audio clip captured at the first time contains the audio content that has been transmitted to the external speaker through the output port based on the difference.

17. The non-transitory computer-readable medium of claim 13, wherein the output port is a 3.5 millimeter jack.

18. The non-transitory computer-readable medium of claim 13, wherein the method further comprises in response to determining that the first audio clip captured at the first time matches the audio content that has been transmitted to the external speaker through the output port, inhibiting the audio content from being presented using the speaker of the computing device.

* * * * *